United States Patent [19]

Asada et al.

[11] Patent Number: 5,304,896
[45] Date of Patent: Apr. 19, 1994

[54] LIGHTING SYSTEM FOR USE IN CABIN OF AUTOMOTIVE VEHICLE

[75] Inventors: Tetsuya Asada; Osamu Kawanobe, both of Kanagawa, Japan

[73] Assignee: Nissan Motor Co., Ltd., Yokohama, Japan

[21] Appl. No.: 892,302

[22] Filed: Jun. 2, 1992

[30] Foreign Application Priority Data

Jun. 10, 1991 [JP] Japan .................. 3-137983

[51] Int. Cl.⁵ .................. B60Q 7/00; B60L 1/14
[52] U.S. Cl. .................. 315/84; 315/77; 315/320; 307/10.8
[58] Field of Search .................. 307/10.1, 10.5, 10.8; 315/77, 84, 320; 362/74, 80, 276, 802

[56] References Cited

U.S. PATENT DOCUMENTS

| | | | |
|---|---|---|---|
| 2,337,794 | 12/1943 | Arenberg | 362/75 |
| 2,582,738 | 1/1952 | Arenberg | 362/75 |
| 2,635,681 | 4/1953 | Hiltman et al. | 362/75 |
| 4,139,801 | 2/1979 | Linares | 315/83 |
| 4,217,628 | 8/1980 | Windom | 362/75 |
| 4,670,819 | 6/1987 | Boerema et al. | 362/80 |
| 4,866,345 | 9/1989 | Kataoka | 315/84 |
| 5,047,688 | 9/1991 | Alten | 315/84 |
| 5,130,901 | 7/1992 | Priesmuth | 362/61 |

FOREIGN PATENT DOCUMENTS 59-145638 8/1984 Japan .
61-193945 2/1985 Japan .

OTHER PUBLICATIONS

Related U.S. patent application Ser. No. 07/761,056, Filedate: Sep. 18, 1991, Inventor: Yoshio Matsuno et al.
Related U.S. patent application Ser. No. 07/761,057, Filedate: Sep. 18, 1991, Inventor: Yoshio Matsuno et al.
Related U.S. patent application Ser. No. 07/761,052, Filedate: Sep. 18, 1991, Inventor: Yoshio Matsuno et al.
Related U.S. patent application Ser. No. 07/761,054, Filedate: Sep. 18, 1991, Inventor: Yoshio Matsuno et al.

Primary Examiner—Robert J. Pascal
Assistant Examiner—Arnold Kinkead
Attorney, Agent, or Firm—Lowe, Price, LeBlanc & Becker

[57] ABSTRACT

A lighting system for use in a cabin of a vehicle is disclosed, in which when a room lamp for a seat occupied by a passenger is in gradual light reduction due to the passenger getting-in, gradual light reduction of the room lamp is continued even if another door is opened.

7 Claims, 4 Drawing Sheets

LIGHTING SYSTEM FOR USE IN CABIN OF AUTOMOTIVE VEHICLE

BACKGROUND OF THE INVENTION

The present invention relates to a lighting system for use in a cabin of an automotive vehicle.

JP-A 59-145638 discloses a lighting system for use in a cabin of an automotive vehicle. With this prior art lighting system, a room lamp is turned on by opening any one of doors, and provides gradually reduced light by closing all the doors. Further, when opening the door again, the room lamp is fully lighted even upon turning-off or in gradual light reduction.

With this prior art lighting system, however, even when a passenger gets in, and the room lamp is in gradual light reduction, this room lamp is lighted again when opening the other door. Thus, not only the passenger who has got in sees no purpose to prevent a quick change in intensity of illumination in the cabin by gradual light reduction before turning-off of the room lamp, but he can feel the repetition of turning-on and gradual light reduction of the room lamps to be exceedingly troublesome.

It is, therefore, an object of the present invention to provide a lighting system for use in a cabin of an automotive vehicle which is capable of carrying out agreeable lighting without a quick change in intensity of illumination.

SUMMARY OF THE INVENTION

According to one aspect of the present invention, there is provided a method of controlling a lighting system for use in a cabin having a plurality of doors, the lighting system including a plurality of lamps arranged to correspond to the plurality of doors and a controller, the method comprising the steps of:

- storing a number of a first one of the plurality of doors which is closed and generating a door number indicative signal;
- starting a gradual light reduction of a first one of the plurality of lamps corresponding to said first one of the plurality of doors;
- checking whether or not a second one of the plurality of doors is opened and generating a door open indicative signal when said second one of the plurality of doors is opened;
- determining whether or not said number of said first one of the plurality of doors is identical to a number of said second one of the plurality of doors in response to said door number indicative signal and generating a door number identical indicative signal when said number of said first one of the plurality of doors is identical to said number of said second one of the plurality of doors; and
- continuing said gradual light reduction of said first one of the plurality of lamps when said door number identical indicative signal fails to be generated.

According to another aspect of the present invention, there is provided a lighting system for use in a cabin having a plurality of doors, comprising:

- a plurality of lamps arranged to correspond to the plurality of doors;
- detection means for detecting an opening and closing of the plurality of doors; and
- a controller connected to said plurality of lamps and said detection means for controlling said plurality of lamps, said controller including:
  - means for storing a number of a first one of the plurality of doors which is closed and generating a door number indicative signal;
  - means for starting a gradual light reduction of a first one of said plurality of lamps corresponding to said first one of the plurality of doors;
  - means for checking whether or not a second one of the plurality of doors is opened and generating a door open indicative signal when said second one of the plurality of doors is opened;
  - means for determining whether or not said number of said first one of the plurality of doors is identical to a number of said second one of the plurality of doors in response to said door number indicative signal and generating a door number identical indicative signal when said number of said first one of the plurality of doors is identical to said number of said second one of the plurality of doors; and
  - means for continuing said gradual light reduction of said first one of said plurality of lamps when said door number identical indicative signal fails to be generated.

DETAILED DESCRIPTION OF THE INVENTION

Figure 1:
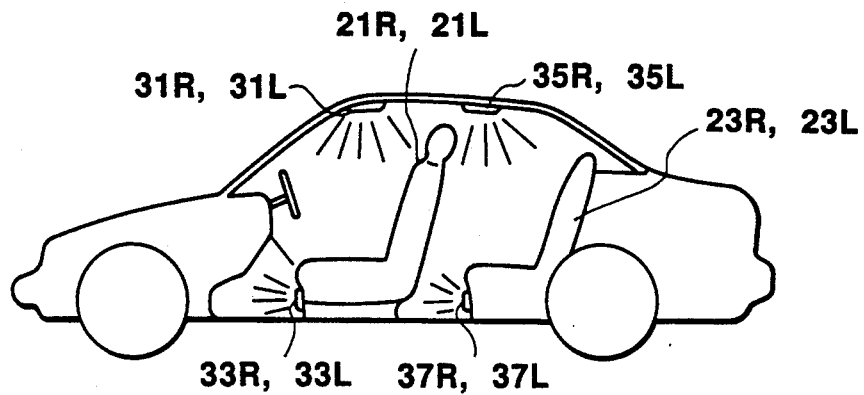
FIG. 1 is a side view of an automotive vehicle having room lamps.

Referring to the drawings, a first preferred embodiment of the present invention will be described. Referring first to FIG. 1, the arrangement of room lamps as a lighting system for use in a cabin of an automotive vehicle will be described. In an automotive vehicle to which the present invention is applied, the room lamps are arranged above and at the foot of right and left front seats 21R, 21L and right and left rear seats 23R, 23L, respectively. Specifically, a front seat lamp 31R and a front foot lamp 33R are arranged above and at the foot of a front seat 21R, respectively; a front seat lamp 31L and a front foot lamp 33L are arranged above and at the foot of a front seat 21L, respectively; a rear seat lamp 35R and a rear foot lamp 37R are arranged above and at the foot of a rear seat 23R, respectively; a rear seat lamp 35L and a rear foot lamp 37L are arranged above and at the foot of a rear seat 23L, respectively.

Figure 2:
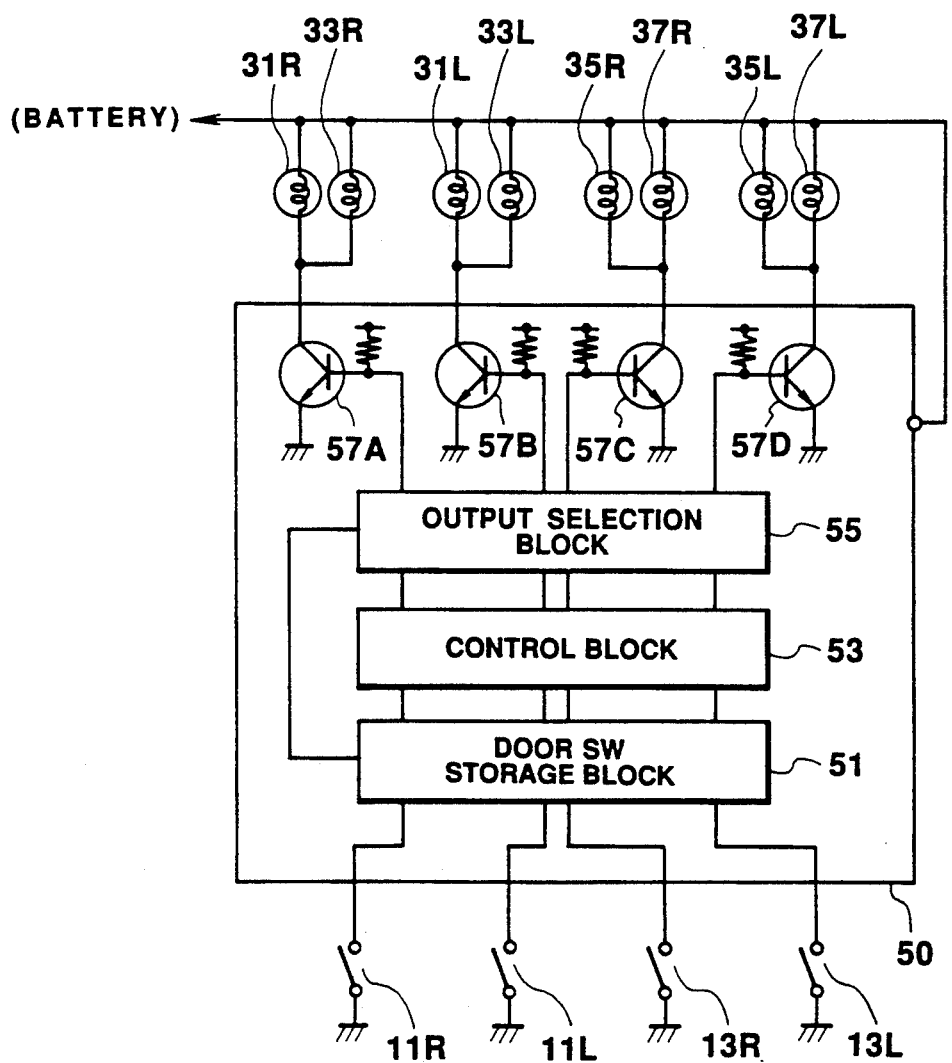
FIG. 2 is a block diagram showing the architecture of a first preferred embodiment of a lighting system for use in a cabin of an automotive vehicle.

Referring to FIG. 2, the architecture of the lighting system according to the present invention will be described. In FIG. 2, the right front seat lamp 31R and the right front foot lamp 33R serve as room lamps for illuminating the right front seat 21R corresponding to a right front door, whereas the left front seat lamp 31L and the left foot lamp 33L serve as room lamps for illuminating the left front seat 21L corresponding to a left front door. Additionally, the right rear seat lamp 35R and the right rear foot lamp 37R serve as room lamps for illuminating the right rear seat 23R corresponding to a right rear seat, whereas the left rear seat lamp 35L and the left rear foot lamp 37L serve as room lamps for illuminating the left rear seat 23L corresponding to a left rear seat. These seat lamps and foot lamps have one end having a leading wire connected to a battery, and the other end having a leading wire connected to a controller 50.

The controller 50 comprises a door switch storage block 51 having interface circuit, RAM, etc., a control block 53 having CPU, ROM, RAM, etc., an output selection block 55, and four transistors each having a base terminal connected to the output selection block 55: a right front seat lighting drive transistor 57A, a left front seat lighting drive transistor 57B, a right rear seat lighting drive transistor 57C, and a left rear seat lighting drive transistor 57D.

In response to control signal of the output selection block 55, the transistor 57A carries out turning-on and gradual light reduction of the right front seat lamp 31R and the right front foot lamp 33R. Similarly, the transistor 57B carries out turning-on and gradual light reduction of the left front seat lamp 31L and the left front foot lamp 33L; the transistor 57C carries out turning-on and gradual light reduction of the right rear seat lamp 35R and the right rear foot lamp 37R; the transistor 57D carries out turning-on and gradual light reduction of the left rear seat lamp 35L and the left rear foot lamp 37L.

Connected to the door switch storage block 51 are a right front door switch 11R for detecting opening and closing of the right front door, a left front door switch 11L for detecting opening and closing of the left front door, a right rear door switch 13R for detecting opening and closing of the right rear door, and a left rear door switch 13L for detecting opening and closing of the left rear door.

Figure 3:
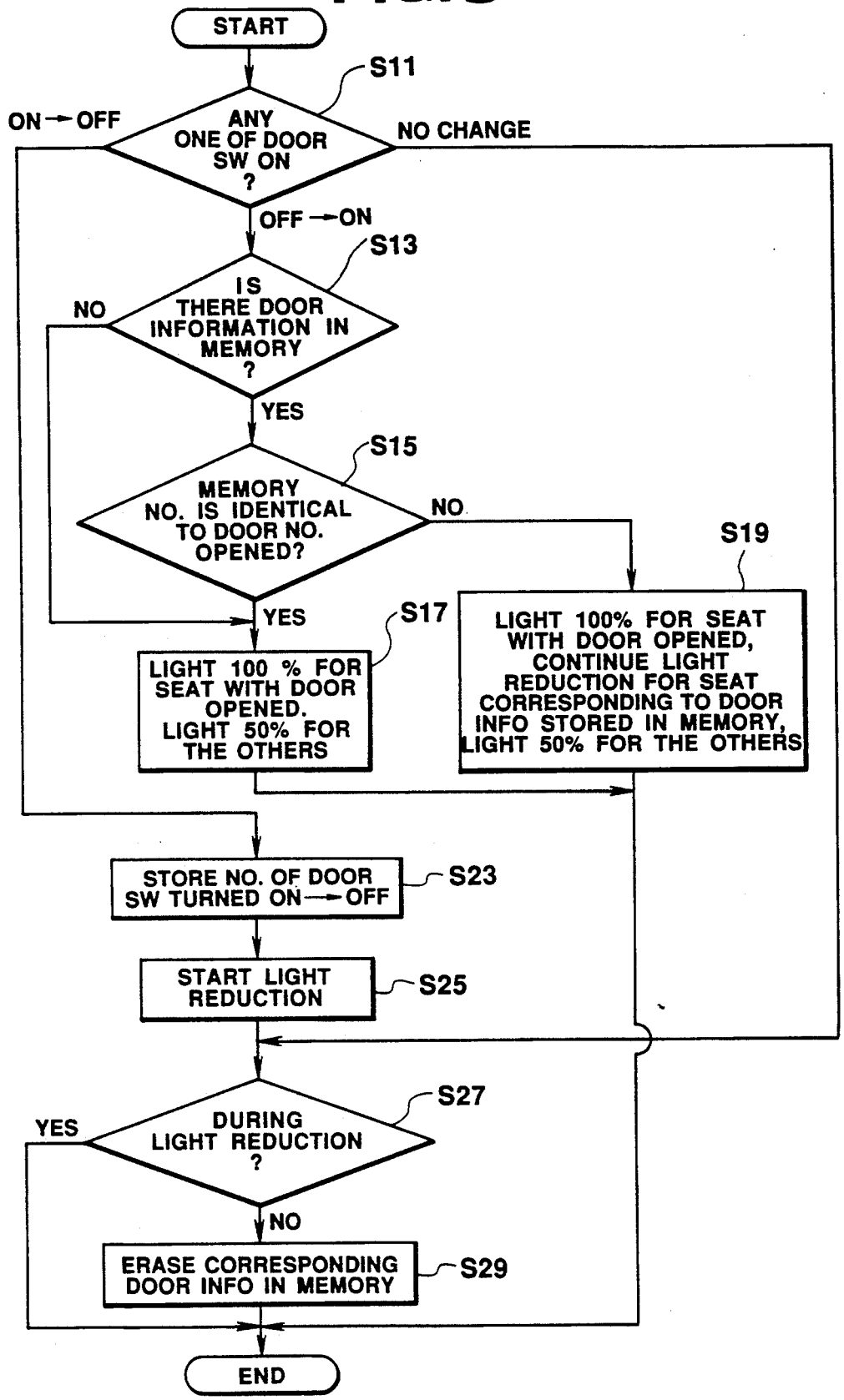
FIG. 3 is a flowchart showing the operation of the first preferred embodiment.
Figure 4:
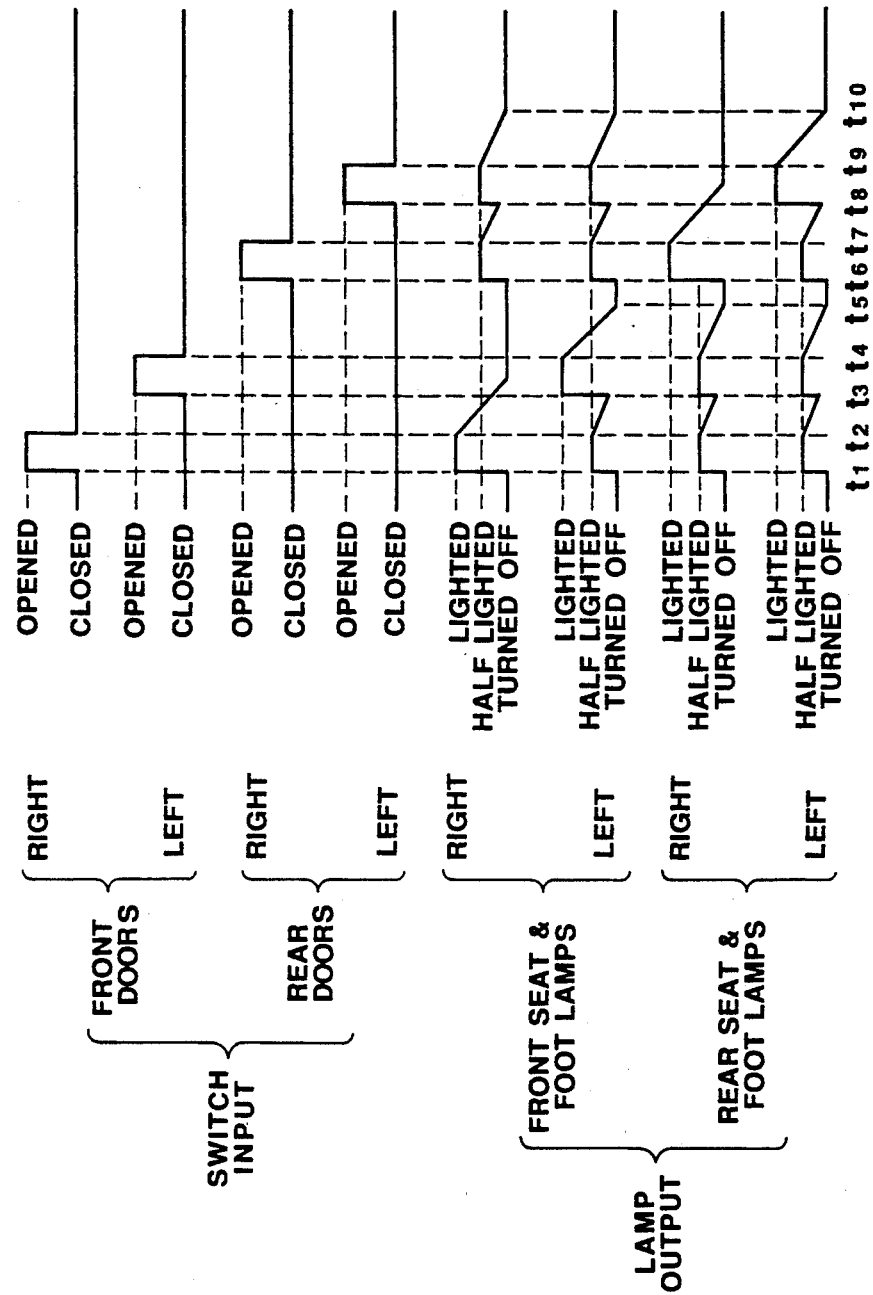
FIG. 4 is a timing chart showing the operation of the first preferred embodiment.

Referring to FIGS. 3 and 4, the operation of the first embodiment will be described. In this embodiment, the control of gradual light reduction of the room lamps is executed by timer interruption, and every predetermined period of time during the other control of the automotive vehicle.

First, at a step S11, opening and closing of the doors of the vehicle is observed. If it is determined that the door switches 11R, 11L, 13R, 13L have no change, i.e., no door is opened or closed, the control routine is terminated.

On the other hand, at the step S11, if any one of the door switches 11R, 11L, 13R, 13L, e.g., the right front door switch 11R for detecting opening and closing of the right front door as a first door is turned on (i.e., the door opened) (see $t_1$–$t_2$ in FIG. 4), the control routine proceeds to a step S13 where it is checked whether or not door information is stored in a memory of the door switch storage block 51. If door information fails to be stored in the memory, the control routine proceeds to a step S17 where the room lamps for the seat corresponding to the door opened by the control block 53, i.e., the front right seat lamp 31R and the right front foot lamp 33R for the right front seat 21R corresponding to the right front door as the first door, are lighted at 100% intensity of illumination, whereas the other room lamps are lighted at 50% intensity of illumination, then the control routine is terminated.

When the right front door switch 11R for the right front door as the first door is turned off (i.e., the door closed) (see $t_2$–$t_3$ in FIG. 4), the control routine proceeds from the step S11 to a step S23 where door information on the right front door is stored in the memory of the door switch storage block 51. at a subsequent step S25, gradual light reduction of the room lamps is started, then the control routine proceeds to a step S27 where it is checked whether or not gradual light reduction of the room lamps is continued. If gradual light reduction is continued, the control routine is terminated.

When gradual light reduction of the room lamps is terminated after a predetermined period of time, the termination of gradual light reduction is checked at the step S27. Subsequently, the control routine proceeds to a step S29 where door information on the door relative to the room lamps having gradual light reduction terminated is erased from the memory of the door switch storage block 51, then the control routine is terminated.

Next, a description will be made with regard to a case where a second door is opened and closed when the room lamps for the first door are in gradual light reduction.

At the step S11, if any one of the door switches 11R, 11L, 13R, 13L, e.g., the left front door switch 11L for detecting opening and closing of the left front door as a second door, is turned on (i.e., the door opened) (see $t_3$–$t_4$ in FIG. 4), the control routine proceeds to the step 13 where it is checked whether or not door information is stored in the memory of the door switch storage block 51. If door information on the first door (i.e., the right front door in FIG. 4), for example, is stored in the memory of the door switch storage block 51, the control routine proceeds to a step S15 where it is checked whether or not the door corresponding to the room lamps which are in gradual light reduction in response to this door information as stored is identical to the door corresponding to the door switch which has been turned on at the step S11. If the answer to the inquiry at the step S15 is NO, i.e., the second door is opened and closed, the control routine proceeds to a step S19.

At the step S19, the room lamps for the seat corresponding to the door opened by the control block 53, i.e., the left front seat lamp 31L and the left front foot lamp 33L for the left front seat 21L corresponding to the left front door as the second door (see $t_3$–$t_4$ in FIG. 4), are lighted at 100% intensity of illumination. At that time, with the room lamps which are in gradual light reduction in response to door information on the first door stored in the memory of the door switch storage block 51, i.e., the right front seat lamp 31R and the right front foot lamp 33R, gradual light reduction is continued (see $t_2$–$t_4$ in FIG. 4). Additionally, the other room lamps are lighted at 50% intensity of illumination (see $t_3$–$t_4$ in FIG. 4), then the control routine is terminated.

When the left front door as the second door is closed (see $t_4$–$t_5$ in FIG. 4), the control routine proceeds from the step S11 to the step S23 where door information on the left front door is stored in the memory of the door switch storage block 51. At the subsequent step S25, gradual light reduction of the room lamps is started, then the control routine is terminated via the step S27.

When gradual light reduction of the right front seat lamp 31R and the right front foot lamp 33R corresponding to the right front door as the first door is terminated after a predetermined period of time, the termination of gradual light reduction is checked at the step S27. Subsequently, the control routine proceeds to the step S29 where door information on the door relative to the room lamps having gradual light reduction terminated is erased from the memory of the door switch storage block 51, then the control routine is terminated.

Figure 5:
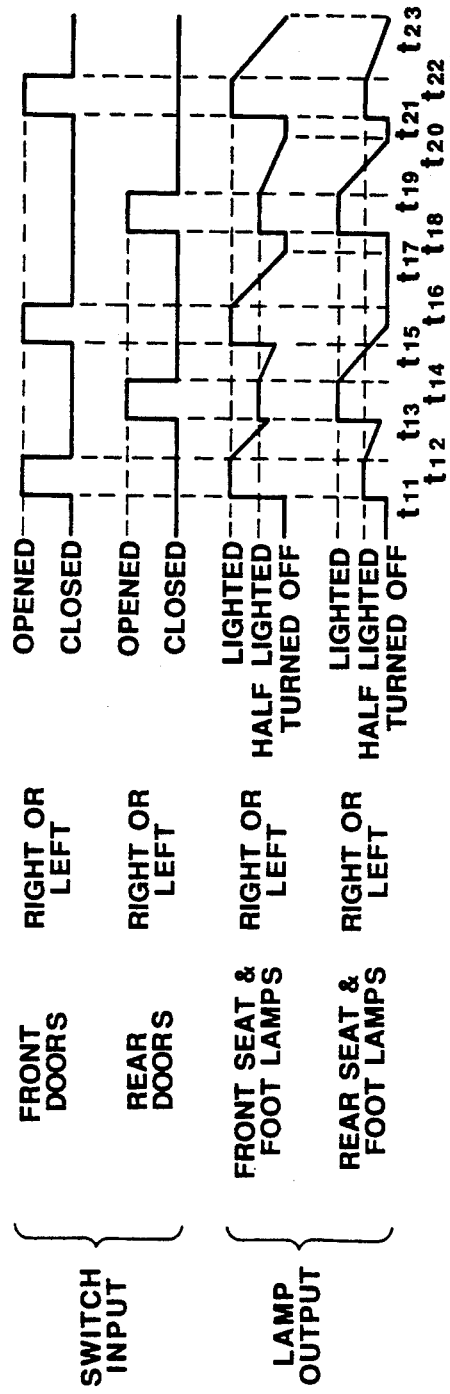
FIG. 5 is a view similar to FIG. 4, showing the operation of a second preferred embodiment.

Referring to FIG. 5, a second preferred embodiment of the present invention will be described. As seen from a timing chart as shown in FIG. 5, in this embodiment, the lighting control as described in connection with the first preferred embodiment is carried out between the front and rear seats, thus largely decreasing the number of control signals, i.e., the number of control lines.

By way of example, in case that after getting out (see $t_{11}-t_{12}$ in FIG. 5) to assist a passenger in the vehicle (see $t_{13}-t_{14}$ in FIG. 5), a taxi driver gets in to reseat on a driver's seat (see $t_{15}-t_{16}$ in FIG. 5), it is assumed that the passenger gets in only from the left rear door. Accordingly, in this case, the control of gradual light reduction of the room lamps between the right and left seats, e.g., the right rear seat 23R and the left rear seat 23L fails to be needed, and only the control of gradual light reduction between the front and rear seats is substantially enough to achieve the object of the present invention.

In the concrete, referring again to FIG. 2, the door switch storage block 51 may control only two kinds of signals indicative of the rear seat or the front seat, i.e., OR signal for the right front door switch 11R and the left front door switch 11L and OR signal for the right rear door switch 13R and the left rear door switch 13L. Additionally, the output selection block 55 may be connected to an output stage of the rear seat lamps 35R, 35L, and the rear foot lamps 37R, 37L only.

According to the embodiments as described above, in case that room lamps are found which are in gradual light reduction due to passenger getting-in, gradual light reduction of these room lamps can be continued even when the other door is opened, without these lamps lighted at 100% intensity of illumination, for example.

In the embodiments as described above, door information on opening and closing of the door is stored in the memory of the door switch storage block. Alternatively, lighting information on lighting of the room lamps may be stored therein. Further, the control routine is executed by timer interruption. Alternatively, the control of gradual light reduction of the room lamps may be started by interlocking the door switches.

What is claimed is:

1. A method of controlling a lighting system for use in a cabin having a plurality of doors, the lighting system including a plurality of lamps arranged to correspond to the plurality of doors, the method comprising the steps of:
    storing a value corresponding to a first one of the plurality of doors which is closed and generating a first door value indicative signal;
    starting a gradual light reduction of a first one of the plurality of lamps corresponding to said first one of the plurality of doors;
    storing a value corresponding to a second one of the plurality of doors which is opened and generating a second door value indicative signal;
    determining whether or not said first door value indicative signal is identical to said second door value indicative signal and generating a door value identical indicative signal when said first door value indicative signal is identical to said second door value indicative signal; and
    continuing said gradual light reduction of said first one of the plurality of lamps when said door value identical indicative signal fails to be generated.

2. A method as claimed in claim 1, further comprising the step of:
    lighting a second one of the plurality of lamps corresponding to said second one of the plurality of doors at a first predetermined level of intensity of illumination, and the other ones of the plurality of lamps at a second predetermined level of intensity of illumination when said door value identical indicative signal fails to be generated.

3. A method as claimed in claim 1, further comprising the step of:
    lighting said first one of the plurality of lamps at a first predetermined level of intensity of illumination, and a second one and the other ones of the plurality of lamps at a second predetermined level of intensity of illumination when said door value identical indicative signal is generated.

4. A method as claimed in claim 3, wherein said first predetermined level of intensity of illumination is 100%, and said second predetermined level of intensity of illumination is 50%.

5. A method as claimed in claim 1, further comprising the steps of:
    checking whether or not said gradual light reduction of said first one of the plurality of lamps corresponding to said first one of the plurality of doors is continued and generating a gradual light reduction indicative signal when said gradual light reduction of said first one of the plurality of lamps corresponding to said first one of the plurality of doors is continued; and
    erasing said value corresponding to said first one of the plurality of doors when said gradual light reduction indicative signal fails to be generated.

6. A lighting system for use in a cabin having a plurality of doors, comprising:
    a plurality of lamps arranged to correspond to the plurality of doors;
    detection means for detecting an opening and closing of the plurality of doors; and
    a controller connected to said plurality of lamps and said detection means for controlling said plurality of lamps, said controller including:
    means for storing a value corresponding to a first one of the plurality of doors which is closed and generating a first door value indicative signal;
    means for starting a gradual light reduction of a first one of said plurality of lamps corresponding to said first one of the plurality of doors;
    means for storing a value corresponding to a second one of the plurality of doors which is opened and generating a second door value indicative signal;
    means for determining whether or not said first door value indicative signal is identical to said second door value indicative signal and generating a door value identical indicative signal when said first door value indicative signal is identical to said second door value indicative signal; and
    means for continuing said gradual light reduction of said first one of said plurality of lamps when said door value identical indicative signal fails to be generated.

7. A lighting system as claimed in claim 6, wherein said detection means include a plurality of door switches.

* * * * *